(12) United States Patent
Holmes

(10) Patent No.: US 8,594,728 B2
(45) Date of Patent: *Nov. 26, 2013

(54) ONE BUTTON ACCESS TO NETWORK SERVICES FROM A REMOTE CONTROL DEVICE

(71) Applicant: AT&T Mobility II LLC, Atlanta, GA (US)

(72) Inventor: David W. Holmes, Sammamish, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/689,747

(22) Filed: Nov. 29, 2012

(65) Prior Publication Data

US 2013/0090092 A1 Apr. 11, 2013

(51) Int. Cl.
*H04M 1/00* (2006.01)

(52) U.S. Cl.
USPC ........ 455/556.1; 455/415; 455/418; 455/419; 455/556.2; 455/557

(58) Field of Classification Search
USPC ............... 455/415, 418–422.1, 556.1–557
See application file for complete search history.

(56) References Cited

U.S. PATENT DOCUMENTS

| | | | | |
|---|---|---|---|---|
| 5,732,132 A * | 3/1998 | Hamada | | 379/354 |
| 6,192,041 B1* | 2/2001 | Phillips | | 370/338 |
| 6,226,375 B1* | 5/2001 | Shaffer et al. | | 379/142.17 |
| 6,496,843 B1* | 12/2002 | Getchius et al. | | 715/210 |
| 6,633,759 B1* | 10/2003 | Kobayashi | | 455/419 |
| 2002/0065041 A1* | 5/2002 | Lunsford et al. | | 455/41 |
| 2003/0069921 A1* | 4/2003 | Lamming et al. | | 709/203 |
| 2004/0053639 A1* | 3/2004 | Petite et al. | | 455/556.1 |
| 2004/0081110 A1* | 4/2004 | Koskimies | | 370/315 |
| 2005/0124381 A1* | 6/2005 | Kim et al. | | 455/556.1 |
| 2005/0177029 A1* | 8/2005 | Shen | | 600/300 |
| 2006/0240849 A1* | 10/2006 | Suzuki | | 455/465 |

* cited by examiner

*Primary Examiner* — Dai A Phuong
(74) *Attorney, Agent, or Firm* — Jackson Walker L.L.P.

(57) ABSTRACT

Systems and methods of accessing a network-based communication service provide for generating a dialing request at a remote control device based on user input. A dialing signal is transmitted toward a mobile communication device based on the request, where the dialing signal instructs the mobile communication device to access the network-based communication service. Communication services can enable a user to use information retrieval at a network server as well as use number dialing at the network server. In one example, the dialing signal is transmitted according to a Bluetooth standard.

20 Claims, 2 Drawing Sheets

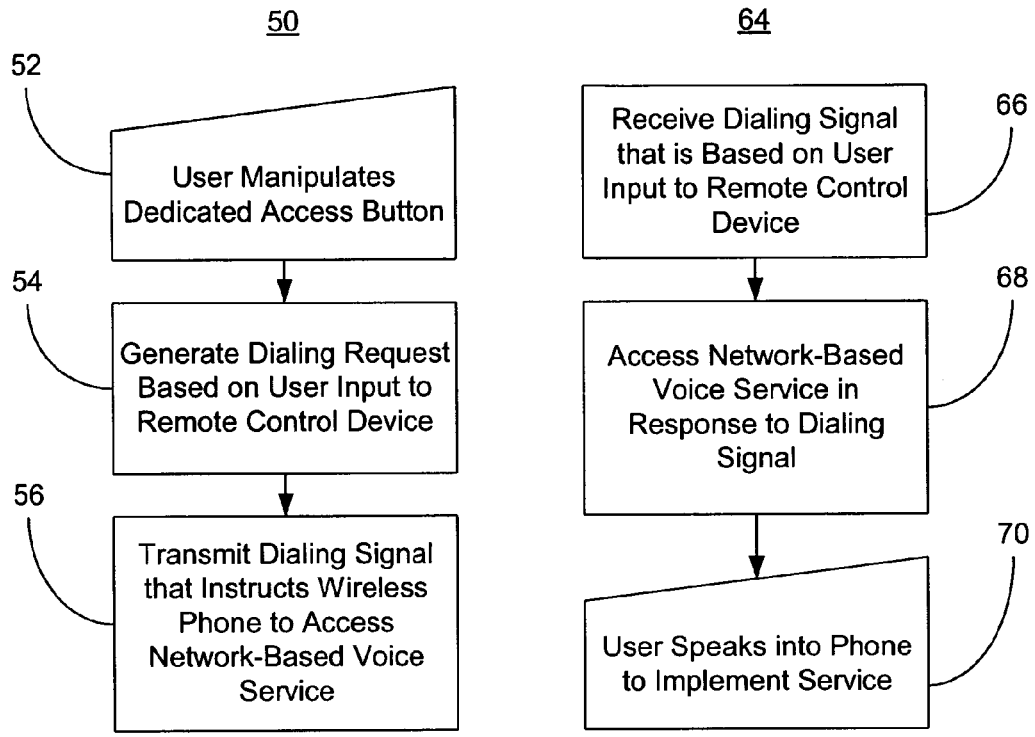

ONE BUTTON ACCESS TO NETWORK SERVICES FROM A REMOTE CONTROL DEVICE

This application is a continuation of U.S. patent application Ser. No. 12/548,962, filed Aug. 27, 2009, now U.S. Pat. No. 8,359,069; which is a continuation of U.S. patent application Ser. No. 10/612,970, filed Jul. 7, 2003, now U.S. Pat. No. 7,583,959; the contents of which are hereby incorporated by reference herein in their entirety into this disclosure.

TECHNICAL FIELD

Embodiments of the present invention generally relate to wireless communication and more particularly, to accessing network-based communication services via a mobile communication device and a remote control device.

BACKGROUND OF THE INVENTION

As society continues to become more and more mobile, the importance of wireless services becomes increasingly apparent. A particular concern relates to the ease of using mobile communication devices. For example, the need to simplify user manipulation of certain mobile communication devices while the user is driving has been well documented. One approach to addressing this concern has been to use speech recognition technology to process voice commands from the user. While the use of speech recognition technology has alleviated concerns in some regards, a number of difficulties remain.

One particular difficulty results from the inherent ergonomic limitations of conventional mobile communication device keypads. For example, a typical mobile communication device such as a wireless phone or personal digital assistant (PDA) configured for wireless communication, has a keypad with many small buttons representing the letters of the alphabet, digits from zero to nine, etc. The size and sheer number of buttons on the keypad can require a relatively high amount of attention and effort on behalf of the user to enter the voice command mode. Thus, although the subsequent entry of voice commands to the speech recognition system of the communication device can reduce the effort required to dial numbers, there is still room for improvement. There is therefore a need for an approach to operating a wireless communication device that does not require the user to manipulate a complicated keypad.

While developments have been made in providing a simplified remote device to be used in conjunction with a wireless communication device, certain difficulties remain. In particular, the typical approach has been to permit the user to store voice tags in the memory of the communication device and access the communication device via a simplified remote device, where the voice tags are associated with telephone numbers stored in the memory of communication device. Such an approach is device-based in that the voice dialing functionality is restricted to the mobile communication device. As a result, the conventional remote device does not facilitate the use of more robust services available on the network. There is therefore a need for a wireless communication technique that provides for access to network-based communication services.

While certain dedicated services like the commercially available OnStar® system provide one-button access to concierge and emergency services, the systems use a transceiver that is fixed to the vehicle and lack flexibility. There is therefore a need for a wireless communication approach that does not require the use of a fixed communication device and/or transceiver.

SUMMARY OF THE INVENTION

Systems and methods of accessing network-based communication services provide for more robust services as well as reduced effort on the part of the user. In one aspect, a method of accessing a network-based communication service provides for generating a dialing request at a remote control device based on user input. A dialing signal is transmitted toward a mobile communication device based on the request, where the dialing signal instructs the mobile communication device to access the network-based communication service.

In another aspect, a method of accessing a network-based communication service provides for receiving a dialing signal at a mobile communication device. The dialing signal is based on user input to a remote control device. The method further provides for accessing the network-based communication service in response to the dialing signal.

Yet another aspect provides for a remote control device having a user interface and a device communication module coupled to the user interface. The device communication module transmits a dialing signal toward a mobile communication device based on a dialing request from the user interface. The dialing signal instructs the mobile communication device to access a network-based communication service.

In another aspect, a mobile communication device includes a phone communication module and a wireless transceiver. The phone communication module receives a dialing signal that is based on user input to a remote control device. The wireless transceiver is coupled to the phone communication module and accesses a network-based communication service in response to the dialing signal.

In a further aspect, a method of providing a network-based communication service provides for receiving a call from a mobile communication device, wherein the call is initiated by user input to a remote control device. The network-based communication service is generated during the call.

BRIEF DESCRIPTION OF THE DRAWINGS

The various advantages of the embodiments of the present invention will become apparent to one skilled in the art by reading the following specification and appended claims, and by referencing the following drawings, in which:

FIG. 3 is a flowchart of an example of a method of using a remote control device to access a network-based communication service according to one embodiment of the invention;

FIG. 4 is a flowchart of an example of a process of processing a dialing request from a user interface according to one embodiment of the invention; and FIG. 5 is a flowchart of an example of a method of using a mobile communication device to access a network-based communication service according to one embodiment of the invention.

DETAILED DESCRIPTION

Figure 1:
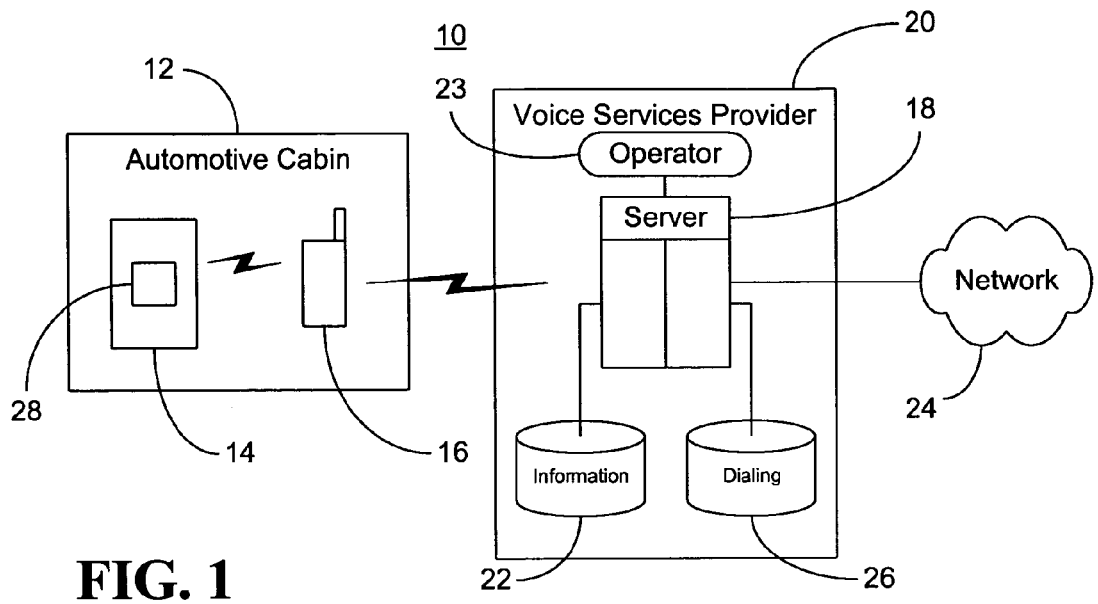
FIG. 1 is a diagram of an example of a wireless communication system according to one embodiment of the invention.

FIG. 1 shows a wireless communication system 10 in which network-based communication services can be accessed from an automotive cabin 12 or other location in a unique and advantageous fashion. Generally, a remote control device 14 communicates with a mobile communication device 16, which communicates with a server 18 operated by a communication services provider 20. The server 18 can provide a wide variety of network-based communication services such as, but not limited to, short messaging service (SMS), multimedia messaging service (MMS), instant messaging (IM), voice information services and voice dialing services to a user (not shown) in automotive cabin 12.

For example, the voice information service can enable the user to retrieve information from information database 22 by speaking into the mobile communication device 16. Information can also be retrieved from an operator 23 in a human-implemented service. The types of information that can be retrieved includes, but is not limited to, sports information, news information, weather forecasts and telephone book listings (i.e., 411 information). The server 18 can also retrieve information from network 24 or any other appropriate source.

Similarly, the voice dialing service can enable the user to use number dialing at the network server 18 by speaking into the mobile communication device 16. Numbers may be stored in a dialing database 26 or retrieved from network 24 or any other suitable location. An example of a commercially available network-based communication service that enables information retrieval as well as voice dialing is the #121 device provided by AT&T Wireless Services in Redmond, Wash.

Alternatively, the network-based communication services can include automated communication services, which do not respond to or require voice commands. One example of an automated communication service is a call being placed by the user and the server 18 automatically playing a prerecorded message. Another example of an automated communication service is the server 18 automatically registering a vote in response to receiving a call. The server could also perform various predetermined functions based on available caller identification (ID) information upon receiving a call.

The user initiates a call to the server 18 by pressing, or otherwise manipulating, a user interface 28 on the remote control device 14, which transmits a dialing signal to the mobile communication device 16. The mobile communication device 16 places the call to the server 18 in response to the dialing signal, where the user is able to input voice commands during the call. Although the connection between the mobile communication device 16 and the remote control device 14 is shown as being a wireless connection, the devices 16,14 can alternatively communicate over a wired connection. The mobile communication device 16 can be a wireless phone, personal digital assistant (PDA) configured for wireless communication, or any other communication device that is readily removable from the automotive cabin 12. An example of a PDA configured for wireless communication is the Siemens SX56 Pocket PC Phone available from AT&T Wireless Services, Redmond, Wash. As will be discussed in greater detail, the remote control device 14 has a simplified user interface 28 that substantially reduces the amount of effort required on the part of the user. The automotive cabin 12 is merely an illustrative example, and represents only one particularly useful environment in which embodiments of the invention can be used.

Figure 2:
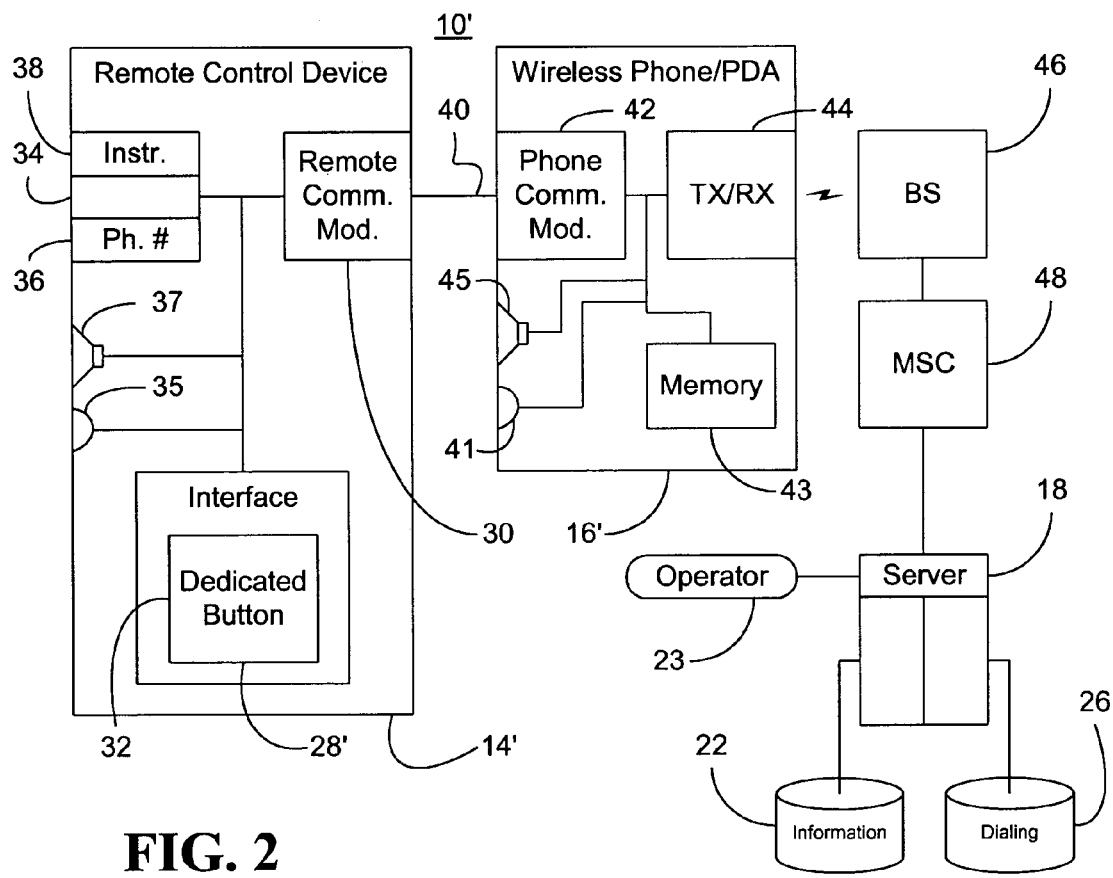
FIG. 2 is a diagram of an example of a wireless communication system according to an alternative embodiment of the invention.

Turning now to FIG. 2, one approach to a wireless communication system 10' is shown in greater detail. Specifically, a remote control device 14' has a user interface 28' and a remote communication module 30 coupled to the user interface 28'. The remote communication module 30 transmits a dialing signal toward the mobile communication device 16' based on a dialing request from the user interface 28'. The dialing signal can be a mere voltage pulse associated with the closing (or opening) of a switch that is incorporated into the button 32, where the pulse instructs the mobile communication device 16' to access a network-based communication service.

In particular, the user interface 28' has an access button 32 that is dedicated to the network-based communication service in question, where user manipulation of the button 32 initiates the dialing request. For example, the button 32 might be a "Voice Dialing" button. Alternatively, the button 32 could be dedicated to all of the communication services provided under a plan associated with a particular service provider. In either case, the button 32 is dedicated to network-based communication services. In the illustrated example, the user interface 28' has no buttons other than the access button 32 in order to maximize simplicity for the user, although additional buttons could be provided. The remote control device 14' may also include a memory 34 that stores a telephone number 36 associated with the network-based communication service. The memory 34 may also store instructions 38 to be used by and/or in conjunction with remote communication module 30 to communicate with device 16'.

The illustrated remote control device 14' also has a microphone 35, which receives audible input such as voice commands from the user, where the audible input generally flows through the remote communication module 30 and the mobile communication device 16' to the server 18. A speaker 37 receives signals in the other direction for audible output to the user. Mobile communication device 16' also has a microphone 41 and speaker 45 for receiving and generating audible signals, respectively. Thus, either remote control device 14' or mobile communication device 16' can be used to communicate once the connection to the network-based communication service has been established. Alternatively, an external microphone and speaker (not shown) may be used to communicate.

The connection 40 between the remote control device 14' and the mobile communication device 16' can be either wired or wireless. The wireless connection can be a radio frequency (RF) connection such as a connection in accordance with a Bluetooth standard (Bluetooth V1.1 Core Specifications, Jan. 3, 2003; Hands-Free Profile Specification V1.0, Apr. 30, 2003, etc.). In such a case, the remote communication module 30 is a Bluetooth module. The wireless connection could also be an IEEE 802.11x connection or an infrared (IR) connection. The wired connection could be made in accordance with any suitable wireline standard (e.g., Telecommunications Industry Association, TIA/EIA-789-A, Electrical Specification for the Portable Phone to Vehicle Interface, April 2000).

As already noted, the mobile communication device 16' can be a wireless phone or a PDA configured for wireless communication, for example. In the illustrated example, mobile communication device 16' has a phone communication module 42 and a wireless transceiver 44 coupled to the phone communication module 42. The wireless transceiver 44, as well as communication device 16, can be readily removed from the automotive cabin 12 (FIG. 1). The phone communication module 42 receives the dialing signal from the remote control device 14' and the wireless transceiver 44 accesses the network-based communication service in response to the dialing signal. The wireless transceiver 44 can obtain the network-based communication service from server 18 via base station (BS) 46 and mobile switching center (MSC) 48.

Turning now to FIG. 3, a method 50 of using a remote control device to access a network-based communication service is shown. Method 50 can be implemented in a remote control device using any combination of commercially available hardware and/or software programming techniques. For example, portions of method 50 can be implemented as a set of instructions stored in a machine-readable medium such as read-only memory (ROM), compact disk ROM (CD-ROM), electrically erasable programmable ROM (EEPROM), random access memory (RAM), etc., where the instructions are capable of being executed by a processor to access network-based communication services.

Specifically, a user manipulates a dedicated access button of a remote control device user interface at processing block 52. Block 54 provides for generating a dialing request based on user input to the remote control device. A dialing signal is transmitted toward a mobile communication device at block 56 based on the request, where the dialing signal instructs the mobile communication device to access the network-based communication service. Such instruction can be accomplished by including a command in the dialing signal that causes the mobile communication device to dial the service number. Alternatively, instruction can be accomplished by including a program call in the dialing signal, where the program call activates a software program in the mobile communication device and the software program dials the service. The software program could be stored in memory 43, which could be a subscriber identity module (SIM), universal SIM (USIM) or other suitable storage medium.

The software program could also check for updates to the service number. Originating the update check at the mobile communication device (i.e., "pull" instead of "push") enables the use of pre-existing security mechanisms of the device, and provides a highly secure update process. As a result, concerns over the service access number being changed to a 900 number or an overseas number as part of an illicit redirection scam can be largely obviated.

FIG. 4 shows one approach to processing a dialing request in greater detail at block 54'. Generally, block 54' has an offline mode and an online mode. In the offline mode, authorization to write to the memory of the remote control device is verified at block 58. Verification can be achieved by any commercially available technique such as personal identification (PIN) authentication or digital signature authentication. Upon verification, block 60 provides for storing a telephone number associated with the network-based communication service, where the data signal is to include the telephone number. The telephone number can be stored based on input from a provider of the network-based communication service, a manufacturer of the remote control device, or the user. Where input from the service provider is used, storage can be initiated by either the service provider or a user of the remote control device. In the online mode, block 62 provides for retrieving the telephone number from the memory of the remote control device. It should be noted that an alternative approach would be to store the service telephone number to a memory 43 (FIG. 2) of the mobile communication device, where the dialing signal further instructs the mobile communication device to retrieve the telephone number from memory 43.

Turning now to FIG. 5, a method 64 of using a mobile communication device to access a network-based communication service is shown. Portions of method 64 may be implemented in a mobile communication device as a set of instructions stored in a machine-readable medium. Specifically, block 66 provides for receiving a dialing signal at the mobile communication device, where the dialing signal is based on user input to a remote control device. The dialing request may be obtained through a user interface. The network-based communication service is accessed at block 68 in response to the dialing signal. Access to the network-based communication service can be made via a traditional circuit-switched connection, or via a packet-switched connection such as a Voice Over Internet Protocol (VoIP) connection. The user is then able to speak into the wireless communication device at block 70 to retrieve, identify and/or use the desired services. Alternatively, the network-based communication services can include services that do not require voice commands. In such a case, accessing the network-based communication service at block 68 would result in automatic generation of the service in question.

Thus, by enabling a user to access network-based communication services from an automotive cabin, the user is presented with many more features than available under conventional approaches. Furthermore, by enabling the user to initiate the dialing request through remote access that is dedicated to a particular network-based communication service, the amount of effort required on the part of the user is significantly reduced.

Those skilled in the art can appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims. Although the innovations disclosed herein have been discussed primarily in the context of generic bearer services, any suitable bearer service may be used such as, but not limited to, GSM, PSTN/ISDN, SIP-based VoIP, ISO/OSI layers 1-3, etc.

What is claimed is:

1. A mobile communication device, comprising:
a processor; and
a memory coupled to the processor;
wherein responsive to executing instructions in the memory, the processor performs operations comprising:
receiving a dialing request from a remote control device, the dialing request comprising a telephone number associated with a network-based communication service and a program call, wherein the program call activates a dialing program on the memory for dialing the network-based communication service,
in response to the program call, performing an update check of the telephone number, wherein the update check includes retrieving an updated telephone number using a pre-existing security feature, and
if the update check returns the updated telephone number, using the updated telephone number for accessing the network-based communication service.

2. The mobile communication device of claim 1, wherein the operations further comprise storing the updated telephone number.

3. The mobile communication device of claim 1, wherein the dialing request is initiated by a user manipulation of an access button of the remote control device.

4. The mobile communication device of claim 1, wherein the network-based communication service is a voice-based information retrieval service.

5. The mobile communication device of claim 1, wherein the network-based communication service includes a voice dialing service, the voice dialing service receiving a voice input comprising a number to be dialed.

6. The mobile communication device of claim 1, wherein the network-based communication service is an automated communication service that does not require voice commands.

7. The mobile communication device of claim 1, wherein receiving the dialing request occurs over a wireless connection with the remote control device.

8. The mobile communication device of claim 7, wherein the wireless connection is a radio frequency connection.

9. The mobile communication device of claim 7, wherein the wireless connection uses a BLUETOOTH protocol.

10. The mobile communication device of claim 7, wherein the wireless connection is an infrared connection.

11. The mobile communication device of claim 1, wherein receiving the dialing request occurs over a wired connection with the remote control device.

12. A non-transitory tangible computer-readable medium including computer-readable instructions that, when executed by a processor, cause the processor to perform operations comprising:
   receiving, at a mobile communication device, a dialing request from a remote control device, the dialing request comprising a telephone number associated with a network-based communication service and a program call, wherein the program call activates a dialing program on the mobile communication device for dialing the network-based communication service,
   in response to receiving the dialing request, performing an update check of the telephone number, the update check retrieving an updated telephone number for the network-based communication service using a pre-existing security feature of the mobile communication device, and
   if the update check returns the updated telephone number, using the updated telephone number for accessing the network-based communication service.

13. The computer-readable medium of claim 12, wherein the operations include storing the updated telephone number.

14. The computer-readable medium of claim 13, wherein the operations include storing the updated telephone number prior to receiving a dialing signal from the remote control device.

15. The computer-readable medium of claim 13, wherein the operations include storing the updated telephone number on the remote control device.

16. The computer-readable medium of claim 13, wherein the storing of the updated telephone number is initiated by the network-based communication service.

17. The computer-readable medium of claim 13, wherein the operations include verifying an authorization to store the updated telephone number before storing the updated telephone number.

18. A server, comprising:
   a processor; and
   a memory coupled to the processor, the memory including instructions that, when executed by the processor, cause the processor to perform operations comprising:
      receiving a pull operation including an update check request from a mobile communication device, the update check request requesting an updated telephone number for a network-based communication service and using a pre-existing security feature of the mobile communication device, the pull operation being triggered by the mobile communication device receiving a dialing request from a remote control device, the dialing request including a program call for activating a dialing program on the mobile communication device for dialing the network-based communication service,
      determining that the updated telephone number exists for the network-based communication service, and
      transmitting the updated telephone number to the mobile communication device,
   wherein the mobile communication device uses the updated telephone number for accessing the network-based communication service.

19. The server of claim 18, wherein the mobile communication device is a personal digital assistant.

20. The server of claim 18, wherein the mobile communication device and the remote control device are mounted within a vehicle.

* * * * *